United States Patent
Kanai et al.

(10) Patent No.: US 11,281,566 B2
(45) Date of Patent: Mar. 22, 2022

(54) SCORING DEVICE, COMPUTER READABLE MEDIUM, AND SCORING METHOD

(71) Applicant: Mitsubishi Electric Corporation, Tokyo (JP)

(72) Inventors: Hayato Kanai, Tokyo (JP); Takanari Fujimoto, Tokyo (JP); Yasuo Hosotani, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/252,328

(22) PCT Filed: Jul. 23, 2018

(86) PCT No.: PCT/JP2018/027444
§ 371 (c)(1),
(2) Date: Dec. 15, 2020

(87) PCT Pub. No.: WO2020/021588
PCT Pub. Date: Jan. 30, 2020

(65) Prior Publication Data
US 2021/0263831 A1    Aug. 26, 2021

(51) Int. Cl.
*G06F 9/44* (2018.01)
*G06F 11/36* (2006.01)
(Continued)

(52) U.S. Cl.
CPC ............ *G06F 11/366* (2013.01); *G06F 8/42* (2013.01); *G06F 16/24578* (2019.01)

(58) Field of Classification Search
None
See application file for complete search history.

(56) References Cited

U.S. PATENT DOCUMENTS

| 9,552,549 B1 * | 1/2017 | Gong | .................... G06N 3/0454 |
| 10,496,818 B2 * | 12/2019 | Cox | ....................... G06F 21/563 |

(Continued)

FOREIGN PATENT DOCUMENTS

| JP | H1078890 A | 3/1998 |
| JP | 2003029970 A | 1/2003 |

(Continued)

*Primary Examiner* — Qamrun Nahar
(74) *Attorney, Agent, or Firm* — Buchanan Ingersoll & Rooney PC

(57) ABSTRACT

Correspondence information has a plurality of records in each of which a first warning type and a first malfunction cause type are associated with each other. Malfunction information has a plurality of second malfunction cause types. A weighting unit determines, by using the malfunction information and the correspondence information, a count of second malfunction cause types each corresponding to the first malfunction cause type. The scoring unit gives a score to the first warning type corresponding to the first malfunction cause type according to the determined count, and generates weighting information in which the first warning type and the score are associated with each other. The scoring unit gives the score having been given to the first warning type to a second warning type corresponding to the first warning type of the weighting information, the analysis result information including the plurality of second warning types.

20 Claims, 12 Drawing Sheets

(51) Int. Cl.
   *G06F 16/2457*   (2019.01)
   *G06F 8/41*      (2018.01)

(56) References Cited

U.S. PATENT DOCUMENTS

| | | | | |
|---|---|---|---|---|
| 2007/0006034 A1* | 1/2007 | Bangel | .................... | G06Q 10/06 |
| | | | | 714/37 |
| 2011/0010685 A1* | 1/2011 | Su | .............................. | G06F 8/34 |
| | | | | 717/102 |
| 2015/0121325 A1* | 4/2015 | Hours | .................... | G06F 11/261 |
| | | | | 716/107 |
| 2017/0075790 A1* | 3/2017 | Macleod | ............. | G06F 11/3668 |
| 2017/0199801 A1* | 7/2017 | Kangas | ............... | G06F 11/3495 |

FOREIGN PATENT DOCUMENTS

| | | |
|---|---|---|
| JP | 2007179488 A | 7/2007 |
| JP | 2008021244 A | 1/2008 |
| JP | 2008071110 A | 3/2008 |
| JP | 2009193099 A | 8/2009 |
| JP | 2010117897 A | 5/2010 |
| JP | 2013131128 A | 7/2013 |
| JP | 2014059775 A | 4/2014 |
| JP | 2015026276 A | 2/2015 |
| JP | 2016045692 A | 4/2016 |
| JP | 2016128941 A | 7/2016 |

* cited by examiner

Fig. 5

32 : MALFUNCTION INFORMATION

| MALFUNCTION CAUSE TYPE | DETAILS | |
|---|---|---|
| REFERENCE TO NON-EXISTING ARRAY INDEX | REFERENCE TO 10TH POSITION OF ARRAY X WAS ATTEMPTED BUT STOPPED BECAUSE ARRAY X ONLY HAD UP TO 9TH POSITION. | FIRST ROW |
| WRITING AT NON-EXISTING ARRAY INDEX | WRITING AT 15TH POSITION OF ARRAY Y WAS ATTEMPTED BUT STOPPED BECAUSE ARRAY Y ONLY HAD UP TO 11TH POSITION. | SECOND ROW |
| REFERENCE BY UNINTENDED VALUE | FUNCTION HAVING TAKEN AS ARGUMENT VARIABLE WITH UNINTENDED VALUE CAUSED EXCEPTION AND STOPPED. | THIRD ROW |

Fig. 6

33 : CORRESPONDENCE INFORMATION

| WARNING TYPE | MALFUNCTION CAUSE TYPE | |
|---|---|---|
| BUFFER OVERFLOW | REFERENCE TO NON-EXISTING ARRAY INDEX | FIRST ROW |
| NO INITIALIZATION | REFERENCE BY UNINTENDED VALUE | SECOND ROW |
| BUFFER OVERFLOW | WRITING AT NON-EXISTING ARRAY INDEX | THIRD ROW |

Fig. 7

34 : THRESHOLD INFORMATION

| MALFUNCTION CRITERION VALUE | WEIGHTING SCORE |
|---|---|
| $1 \leq X < 50$ | 1 |
| $50 \leq X < 100$ | 5 |
| $100 \leq X$ | 10 |

- FIRST ROW
- SECOND ROW
- THIRD ROW

Fig. 8

12a : WEIGHTING INFORMATION

| WARNING TYPE | WEIGHTING SCORE |
|---|---|
| BUFFER OVERFLOW | 10 |
| NO INITIALIZATION | 5 |

- FIRST ROW
- SECOND ROW

Fig. 12

13a : SCORING INFORMATION

| FILE | TOTAL SCORE | |
|---|---|---|
| a. c | 15 | ← FIRST ROW |
| c. c | 5 | ← SECOND ROW |

SCORING DEVICE, COMPUTER READABLE MEDIUM, AND SCORING METHOD

TECHNICAL FIELD

The present invention relates to a scoring device, a scoring program, and a scoring method which give a score to a result of static analysis of a source code.

BACKGROUND ART

Static analysis is a technique of analyzing a source code and extracting a portion that may cause a potential malfunction such as system stop. Conventionally, warnings of static analysis are narrowed down by using weighting created manually (for example, Patent Literature 1).

CITATION LIST

Patent Literature

Patent Literature 1: JP 2014-059775 A

SUMMARY OF INVENTION

Technical Problem

With static analysis, a malfunction such as memory buffer overflow and memory leak can be detected. However, in the prior art, a large amount of warnings of malfunctions including a minor malfunction are outputted. Therefore, it is difficult to grasp a warning of a potential malfunction in a product under development.

An objective of the present invention is to provide a technique of extracting a warning of a potential malfunction from a result of static analysis of a source code.

Solution to Problem

A scoring device of the present invention includes:

a weighting unit to determine, by using correspondence information having a plurality of records in each of which a first warning type that indicates a type of warning being made based on static analysis of a source code and a first malfunction cause type that indicates a type of a cause of a past malfunction are associated with each other, and by using malfunction information having a plurality of second malfunction cause types each of which indicates a type of a cause of a past malfunction, a count of second malfunction cause types each corresponding to the first malfunction cause type of the record, to give a score to the first warning type corresponding to the first malfunction cause type, according to the determined count, and to generate weighting information in which the first warning type and the score are associated with each other; and a scoring unit to give the score having been given to the first warning type to, among the plurality of second warning types of analysis result information, a second warning type corresponding to the first warning type of the weighting information, the analysis result information including the plurality of second warning types which are a result of static analysis of the source code.

Advantageous Effects of Invention

According to the present invention, it is possible to provide a technique of extracting a warning of a potential malfunction from a result of static analysis of a source code.

BRIEF DESCRIPTION OF DRAWINGS

FIG. 5 is a diagram of Embodiment 1, which is a diagram illustrating malfunction information.

FIG. 6 is a diagram of Embodiment 1, which is a diagram illustrating correspondence information.

FIG. 7 is a diagram of Embodiment 1, which is a diagram illustrating threshold information.

FIG. 8 is a diagram of Embodiment 1, which is a diagram illustrating weighting information.

FIG. 12 is a diagram of Embodiment 1, which is a diagram illustrating scoring information.

DESCRIPTION OF EMBODIMENTS

Embodiment 1

Figure 1:
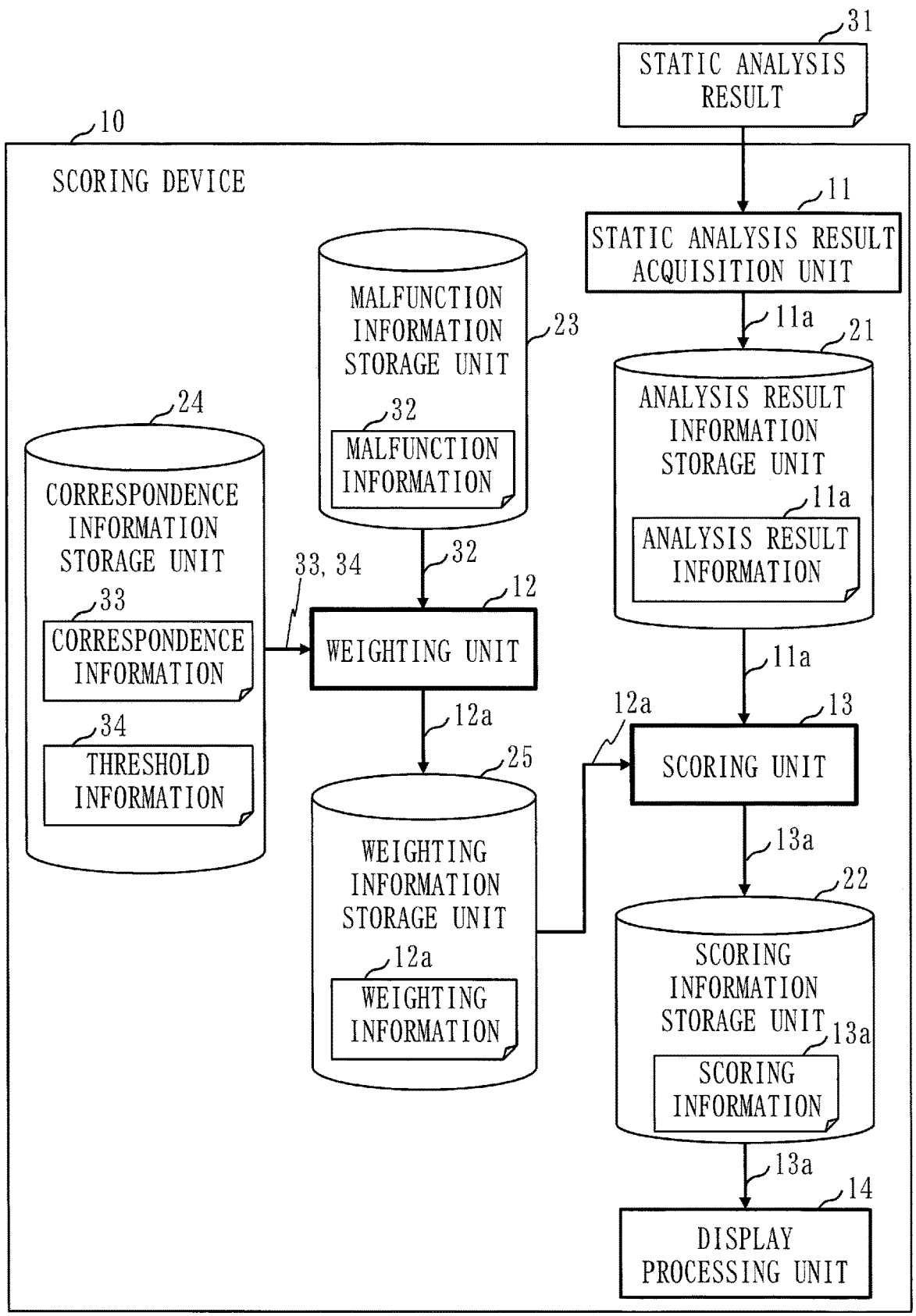
FIG. 1 is a diagram of Embodiment 1, which is a function block diagram of a scoring device.

FIG. 1 illustrates a function block of a scoring device 10 which gives a score to a source code. A static analysis result 31 of the source code is inputted to the scoring device 10, and the scoring device 10 displays scoring information 13a onto a display device.

Description of Configurations

As illustrated in FIG. 1, the scoring device 10 has a static analysis result acquisition unit 11, a weighting unit 12, a scoring unit 13, and a display processing unit 14, as function elements. The scoring device 10 also has an analysis result information storage unit 21, a scoring information storage unit 22, a malfunction information storage unit 23, a correspondence information storage unit 24, and a weighting information storage unit 25, as storage units.

Figure 2:
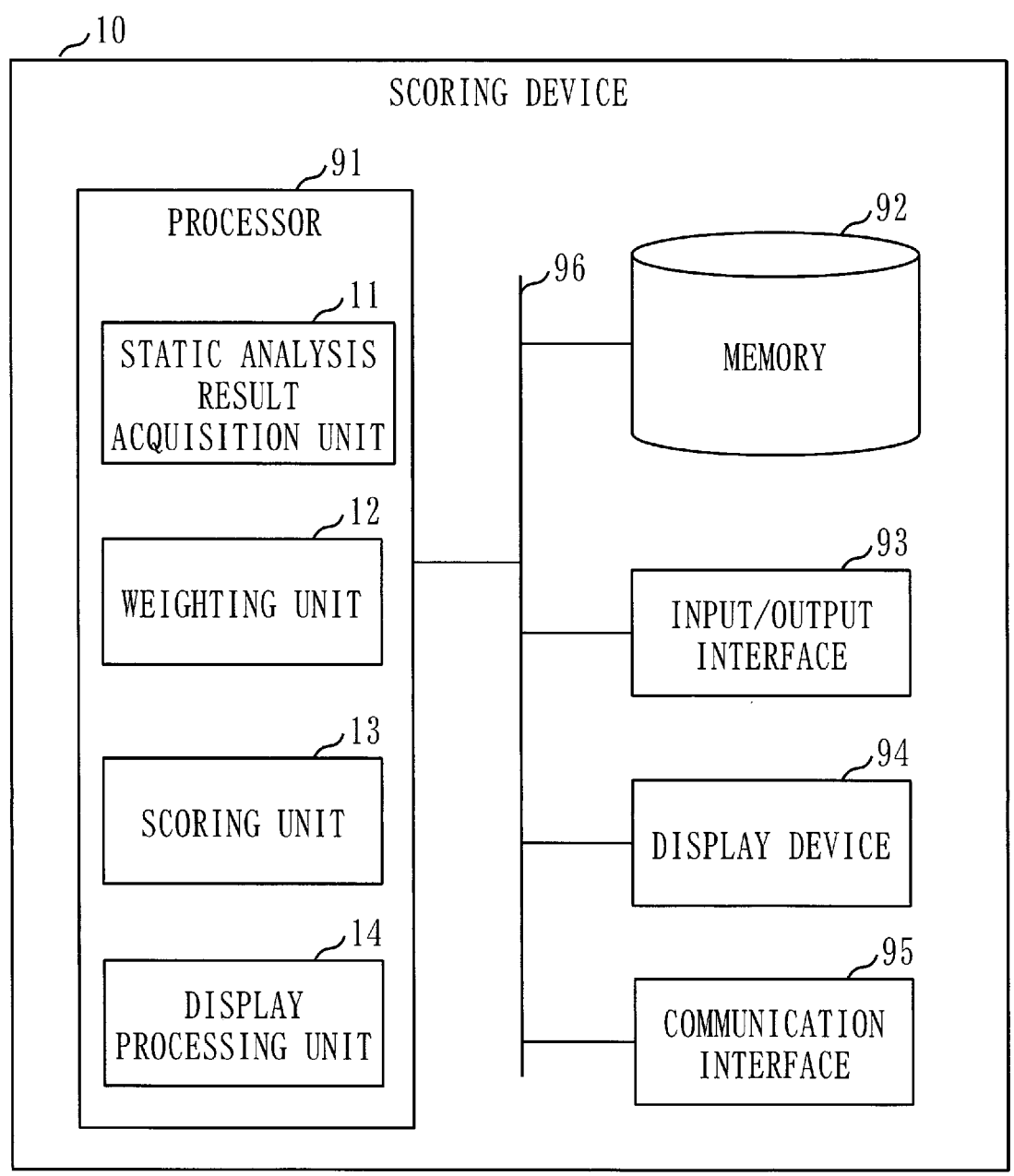
FIG. 2 is a diagram of Embodiment 1, which is a diagram illustrating a hardware configuration of the scoring device.

FIG. 2 illustrates a hardware configuration of the scoring device 10 which is a computer. The scoring device 10 has a processor 91, a memory 92, an input/output interface 93, a display device 94, and a communication interface 95, as hardware devices. The processor 91 is connected to the other hardware devices via a signal line 96, and controls these other hardware devices.

Functions of the static analysis result acquisition unit 11, weighting unit 12, scoring unit 13, and display processing unit 14 which are the function elements of the scoring device 10 are implemented by software.

The processor 91 is a device that executes a scoring program. The scoring program is a program that implements functions of the static analysis result acquisition unit 11, weighting unit 12, scoring unit 13, and display processing unit 14. The processor 91 is an Integrated Circuit (IC) which performs computation processing. Specific examples of the processor 91 include a Central Processing Unit (CPU), a Digital Signal Processor (DSP), and a Graphics Processing Unit (GPU).

The memory 92 is a storage device which stores data. The analysis result information storage unit 21, the scoring information storage unit 22, the malfunction information storage unit 23, the correspondence information storage unit 24, and the weighting information storage unit 25 are implemented by the memory 92. Specific examples of the memory 92 include a Static Random-Access Memory (SRAM) and a Dynamic Random-Access Memory (DRAM). The specific examples of the memory 92 may include an auxiliary storage device such as a Hard Disk Drive (HDD). The memory 92 holds a computation result of the processor 91.

A device to input/output data and a result is connected to the input/output interface 93. Examples of a device to input/output data and a result include a mouse and a keyboard.

The display device 94 is controlled by the display processing unit 14 to display information.

The communication interface 95 is an interface device to communicate with the other devices via a network. Specific examples of the communication interface 95 include a communication board.

The scoring program is read by the processor 91 and executed by the processor 91. Not only the scoring program but also an Operating System (OS) is stored in the memory 92. The processor 91 executes the scoring program while executing the OS.

The scoring device 10 may be provided with a plurality of processors that substitute for the processor 91. The plurality of processors share execution of the scoring program. Each processor is a device that executes the scoring program just like the processor 91 does.

Data, information, signal values, and variable values utilized, processed, or outputted by the scoring program are stored in the memory 92, or in a register or cache memory in the processor 91. The scoring program is a program that causes the computer to execute processes, procedures, or stages which are the static analysis result acquisition unit 11, weighting unit 12, scoring unit 13, and display processing unit 14 with their "unit" being replaced by "process", "procedure", or "stage". The scoring method is a method carried out by the scoring device 10 executing the scoring program.

The scoring program may be stored in a computer readable recording medium and provided in the form of the recording medium, or may be provided as a program product.

The static analysis result acquisition unit 11 acquires the static analysis result 31. The static analysis result acquisition unit 11 extracts a warning type, a file name, and a row number from the acquired static analysis result 31 and generates analysis result information 11*a*. The static analysis result acquisition unit 11 stores the analysis result information 11*a* into the analysis result information storage unit 21.

The malfunction information storage unit 23 stores malfunction information 32. The correspondence information storage unit 24 stores correspondence information 33 indicating correspondence between the warning type of the analysis result information 11*a* and a malfunction cause type of the malfunction information 32.

The weighting unit 12 acquires the malfunction information 32 from the malfunction information storage unit 23 and acquires the correspondence information 33 and threshold information 34 from the correspondence information storage unit 24. The weighting unit 12 generates weighting information 12*a* of the warning type and stores the weighting information 12*a* into the weighting information storage unit 25.

The scoring unit 13 acquires the analysis result information 11*a* from the analysis result information storage unit 21 and acquires the weighting information 12*a* of the warning type from the weighting information storage unit 25. The scoring unit 13 generates the scoring information 13*a* and stores the scoring information 13*a* into the scoring information storage unit 22.

The display processing unit 14 displays the scoring information 13*a* stored in the scoring information storage unit 22.

Description of Operations

Figures 3, 4:
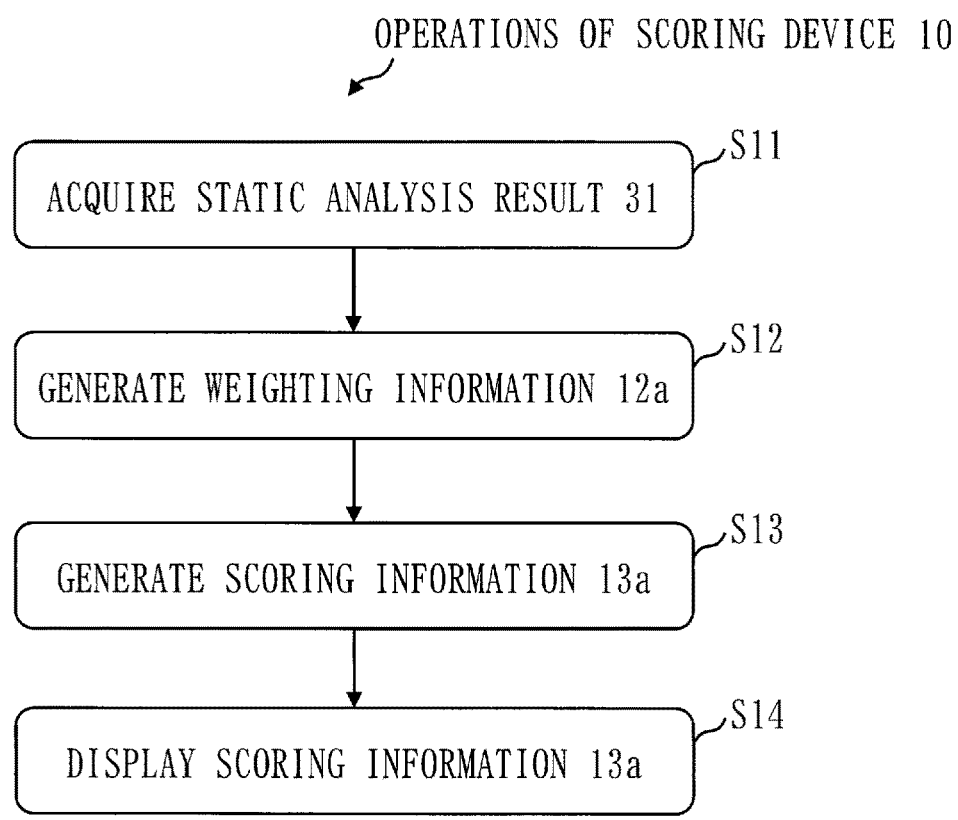
FIG. 3 is a diagram of Embodiment 1, which is a flowchart illustrating operations of the scoring device.
FIG. 4 is a diagram of Embodiment 1, which is a diagram illustrating analysis result information.

FIG. 3 is a flowchart illustrating operations of the scoring device 10. The operations of the scoring device 10 correspond to a scoring method. The operations of the scoring device 10 correspond to processing of the scoring program.

The processing of the scoring device 10 will be described with referring to FIG. 3. The scoring device 10 executes processes of step S11 to step S14. Step S11 is an acquisition process of the static analysis result 31. Step S12 is a process of generating the weighting information 12*a*. Step S13 is a process of generating the scoring information 13*a*. Step S14 is a process of displaying the scoring information 13*a*.

Step S11

The static analysis result acquisition unit 11 acquires the static analysis result 31 via the input/output interface 93 or the communication interface 95. The static analysis result acquisition unit 11 converts the static analysis result 31 into the analysis result information 11*a* and stores the analysis result information 11*a* into the analysis result information storage unit 21.

The static analysis result 31 is a result of static analysis of the source code. The static analysis result 31 includes a warning type indicating a type of a potential malfunction, a file name indicating a file of the source code that involves a portion of the potential malfunction, and a "row number" of the portion of the potential malfunction.

FIG. 4 illustrates the analysis result information 11*a* the static analysis result acquisition unit 11 generates. The analysis result information 11*a* is information which has been converted from the static analysis result 31 into a table format. The analysis result information 11*a* includes a warning type, a file name, and a row number. As the warning type, the file name, and the row number, the first row indicates buffer overflow, a.c, and 1432, respectively, the second row indicates no initialization, a.c, and 25, respectively, and the third row indicates no initialization, c.c, and 154, respectively.

Step S12

The weighting unit 12 reads the malfunction information 32 from the malfunction information storage unit 23 and reads the correspondence information 33 and the threshold information 34 from the correspondence information storage unit 24. The weighting unit 12 generates the weighting information 12a. The weighting unit 12 stores the generated weighting information 12a into the weighting information storage unit 25.

Specific processing is as follows.

FIG. 5 illustrates the malfunction information 32. The malfunction information 32 is information indicating actual past malfunctions that occurred when the source code was executed. The malfunction information 32 indicates the past malfunctions in the table format. The malfunction information 32 describes detailed contents of a plurality of malfunction cause types. A malfunction cause type is information indicating classification of a malfunction cause. A malfunction cause type on the first row is a reference to a non-existing array index. A malfunction cause type on the second row is a writing at a non-existing array index. A malfunction cause type on the third row is a reference by an unintended value. The first row in detail includes a content that "reference to the 10th positon of an array X was attempted but stopped because the array X only had up to 9th position". The second row in detail includes a content that "writing at 15th position of an array Y was attempted but stopped because the array Y only had up to 11th position". The third row in detail includes a content that "a function having taken as an argument a value with an unintended value caused an exception and stopped".

FIG. 6 indicates the correspondence information 33. The correspondence information 33 is information in which the analysis result information 11a and the malfunction information 32 are associated with each other. Specifically, the correspondence information 33 associates the warning type of the analysis result information 11a and the malfunction cause type of the malfunction information 32 with each other. As the warning type and the malfunction cause type, the first row indicates buffer overflow and a reference to a non-existing arrow index, respectively, the second row indicates no initialization and a reference by an unintended value, respectively, and the third row indicates buffer overflow and a writing at a non-existing array index, respectively.

FIG. 7 illustrates the threshold information 34. The threshold information 34 indicates a relationship between a malfunction count X of the malfunction information 32, and a weighting score. As illustrated in FIG. 7, when the malfunction count X is 1 or more to less than 50, the weighting score is 1. When the malfunction count X is 50 or more to less than 100, the weighting score is 5. When the malfunction count X is 100 or more, the weighting score is 10.

FIG. 8 illustrates the weighting information 12a. The weighting information 12a indicates a weighting score of each warning type. As the warning type and the weighting score, the first row indicates buffer overflow and a score of 10, respectively, and the second row indicates no initialization and a score of 5, respectively.

Figure 9:
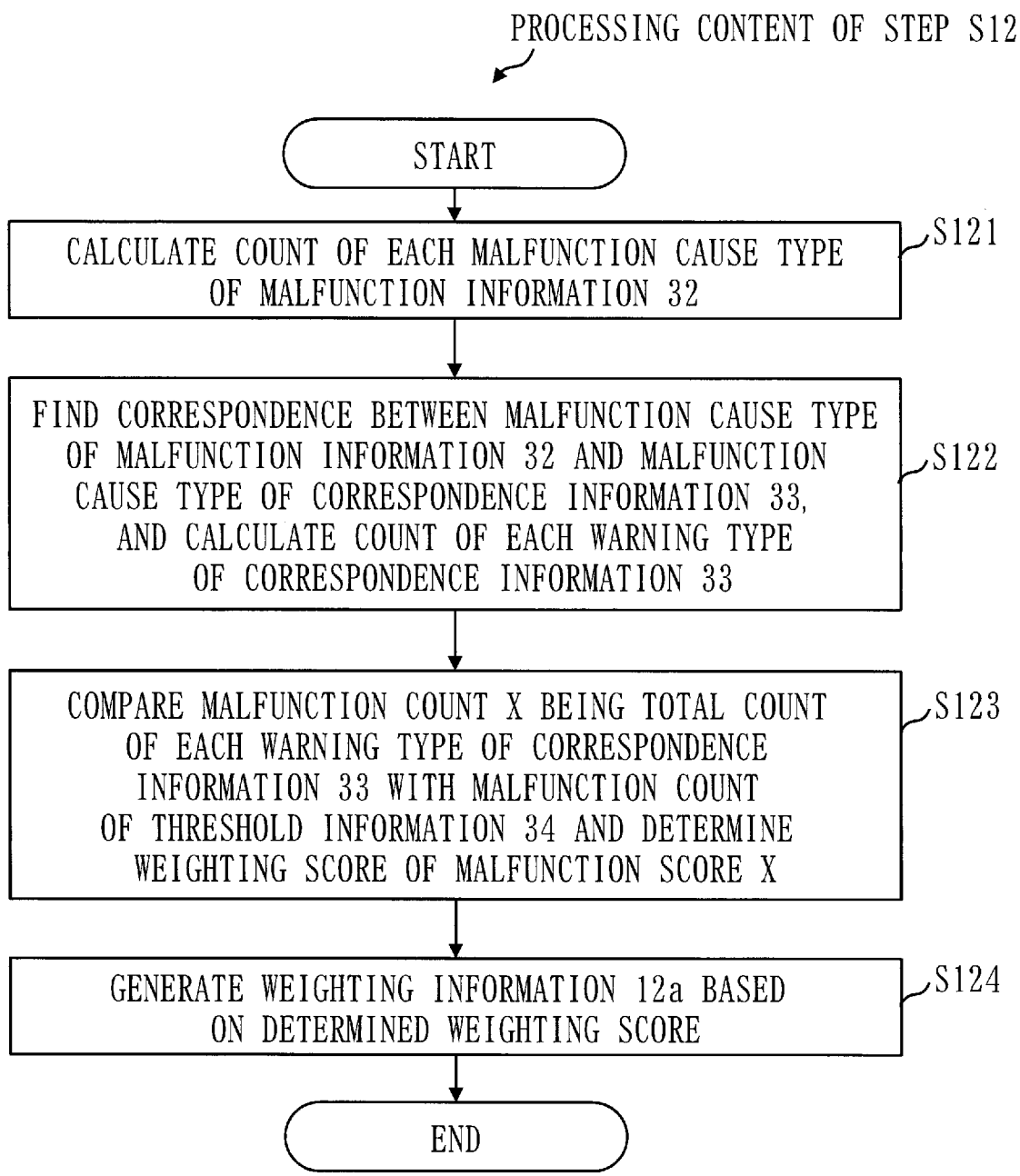
FIG. 9 is a diagram of Embodiment 1, which is a flowchart illustrating a content of step S12.

FIG. 9 is a flowchart illustrating a content of step S12 which is a process of generating the weighting information 12a.

Figure 10:
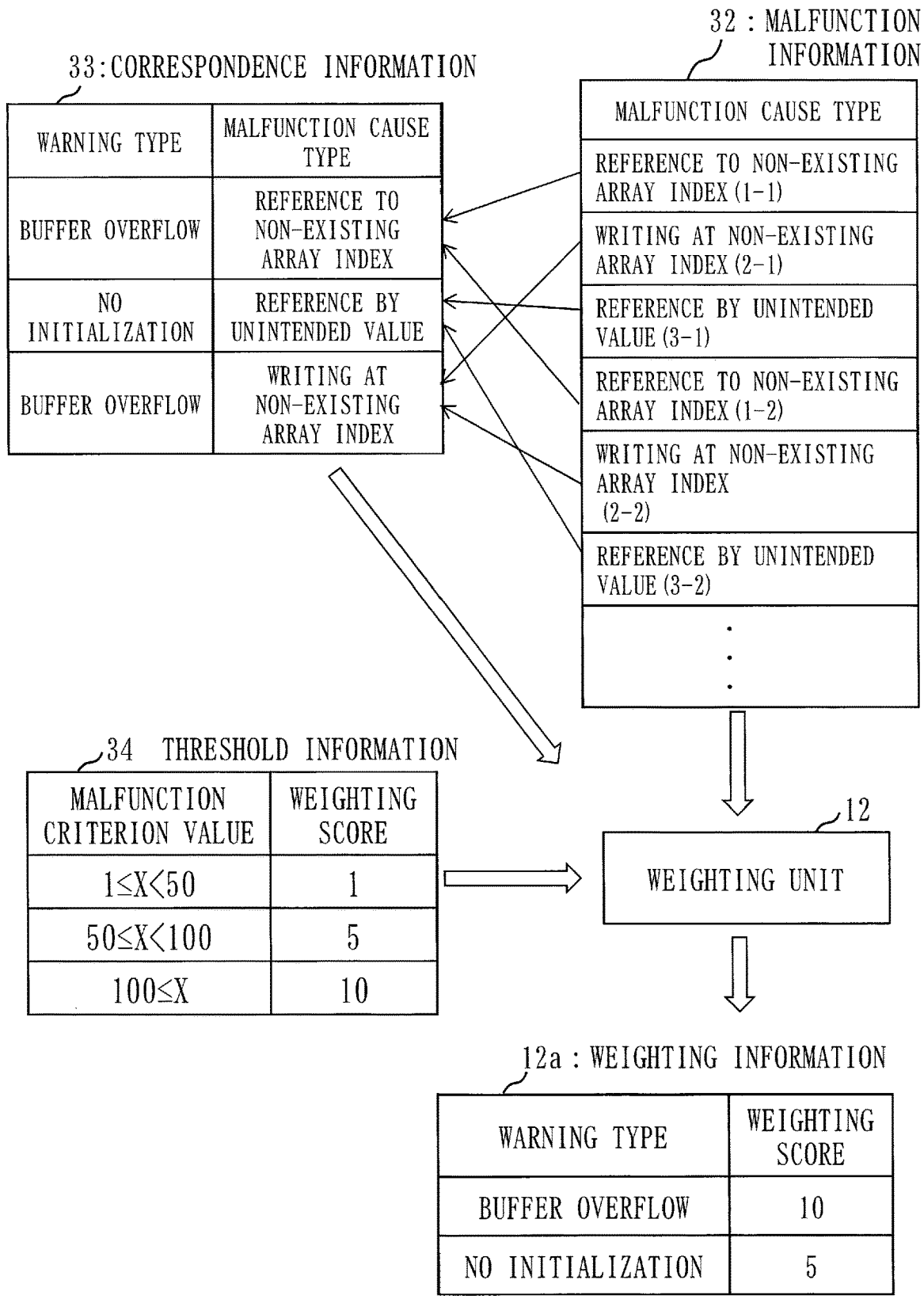
FIG. 10 is a diagram of Embodiment 1, which is a diagram describing the content of step S12.

FIG. 10 is a diagram describing the content of step S12. Step S121 to step S124 which describe the content of step S12 will be described with referring to FIGS. 9 and 10.

Step S121

The scoring unit 13 calculates a count of each malfunction cause type of the malfunction information 32. In FIG. 10, the scoring unit 13 calculates a count of references to a non-existing array index (1-1), (1-2), . . . , a count of writings at a non-existing array index (2-1), (2-2), . . . , and a count of references by an unintended value (3-1), (3-2), . . . Assume that references to a non-existing array index count 30 of (1-1) to (1-30). Assume that writings at a non-existing array index count 90 of (2-1) to (2-90). Assume that references by a unintended value count 60 of (3-1) to (3-60).

Step S122

The scoring unit 13 uses the calculation result from the malfunction information 32 to calculate the count of each warning type of the correspondence information 33. As indicated in the correspondence information 33 of FIG. 10, the reference to a non-existing array index corresponds to buffer overflow, and the writing at a non-existing array index corresponds to buffer overflow. Hence, the scoring unit 13 calculates 30+90 to obtain 120 as the malfunction count X of buffer overflow. The reference by an unintended value corresponds to no initialization. The scoring unit 13 calculates 60+0 to obtain 60 as the malfunction count X of no initialization.

Step S123

The scoring unit 13 refers to the threshold information 34 to determine the weighting score based on the malfunction count X obtained in step S122. In step S122, (malfunction count X of buffer overflow)=120, and (malfunction count X of no initialization)=60. Hence, referring to the threshold information 34, the scoring unit 13 determines the weighting score of buffer overflow as 10, and determines the weighting score of no initialization as 5.

Step S124

The scoring unit 13 generates the weighting information 12a from the weighting score of each warning type determined in step S123. According to this example, in the weighting information 12a, the weighting score of buffer overflow is 10, and the weighting score of no initialization is 5, as illustrated in FIG. 10.

The content of step S12 has been described above. The process of the weighting unit 12 in step S12 will be summarized as follows. In the following, the warning type of the correspondence information 33 is referred to as the first warning type, and the warning type of the analysis result information 11a is referred to as the second warning type. The malfunction cause type of the correspondence information 33 is referred to as the first malfunction cause type, and the malfunction cause type of the malfunction information 32 is referred to as the second malfunction cause type. The weighting unit 12 uses the correspondence information 33 and the malfunction information 32 to determine a count of the second malfunction cause types each corresponding to the first malfunction cause type of the record. The correspondence information 33 is information having a plurality of records in each of which the first warning type that indicates the type of warning being made based on static analysis of the source code and the first malfunction cause type that indicates the type of a cause of a past malfunction are associated with each other. A record is each row of the first to the third rows of FIG. 6. The malfunction information 32 has a plurality of second malfunction cause types each of which indicates a type of a cause of a past malfunction. When the count of second malfunction cause types is determined, the weighting unit 12 gives a score to the first warning type corresponding to the first malfunction cause type, according to the determined count, and generates the weighting information 12a in which the first warning type and the score are associated with each other.

Step S13

Step S13 which is a process of generating the scoring information 13a will now be described. In step S13, the scoring unit 13 gives weighting scores associated with the warning types of the weighting information 12a for the warning types, to the warning types of the individual rows of the analysis result information 11a, and adds up the weighting scores it has given, per file name, to generate the scoring information 13a.

Figure 11:
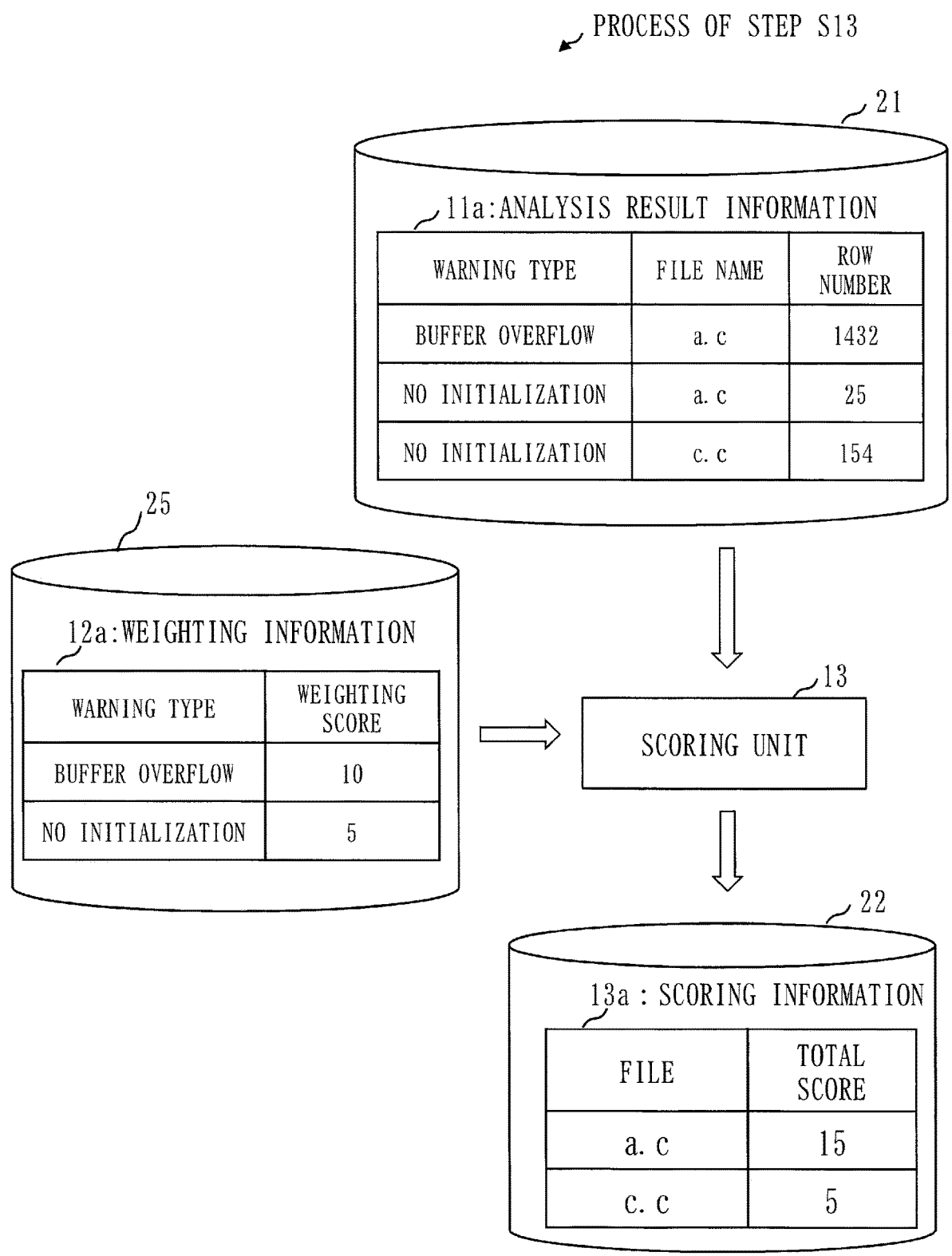
FIG. 11 is a diagram of Embodiment 1, which is a diagram describing a content of step S13.

FIG. 11 is a diagram describing step S13. In step S13, the scoring unit 13 acquires the analysis result information 11a from the analysis result information storage unit 21, and acquires the weighting information 12a from the weighting information storage unit 25. The scoring unit 13 refers to the weighting information 12a to give the weighting scores to the individual warning types of the analysis result information 11a. In the case of FIG. 11, the scoring unit 13 gives a score of 10 to "buffer overflow" of file name "a.c", a score of 5 to "no initialization" of file name "a.c", and a score of 5 to "no initialization" of file name "c.c", in the analysis result information 11a. The scoring unit 13 adds up the weighting scores per file name, to generate the scoring information 13a. In this example, the weighting score for file name "a.c" is 15, and the weighting sore for file name "c.c" is 5. The scoring unit 13 stores the generated scoring information 13a into the scoring information storage unit 22.

FIG. 12 is a diagram illustrating the scoring information 13a. As the file and the total score, the first row indicates a.c and a score of 15, respectively, and the second row indicates c.c and a score of 5, respectively.

The content of step S13 has been described above. The process of the scoring unit 13 of step S13 will be summarized as follows. The scoring unit 13 gives the score having been given to the first warning type to, among a plurality of second warning types of the analysis result information 11a, a second warning type corresponding to the first warning type of the weighting information 12a, the analysis result information 11a including the plurality of second warning types which are the result of static analysis of the source code.

As has been stated in the description of FIG. 11, in the analysis result information 11a, individual ones of the plurality of second warning types, file names expressing the source code, and the row numbers of rows where warning types are included are associated with each other. The row number of a row where a warning type is included is position information indicating a position where the warning type such as buffer overflow exists in the source code. The scoring unit 13 calculates a total of scores of second warning types whose file names are the same. As has been stated in the description of FIG. 11, the scoring unit 13 generates the weighting information 12a using the threshold information 34 in which a count of malfunctions and the weighting score are associated with each other.

Step S14

The display processing unit 14 reads the scoring information 13a from the scoring information storage unit 22 and displays the scoring information 13a onto the display device 94.

Modification 1

Figure 13:
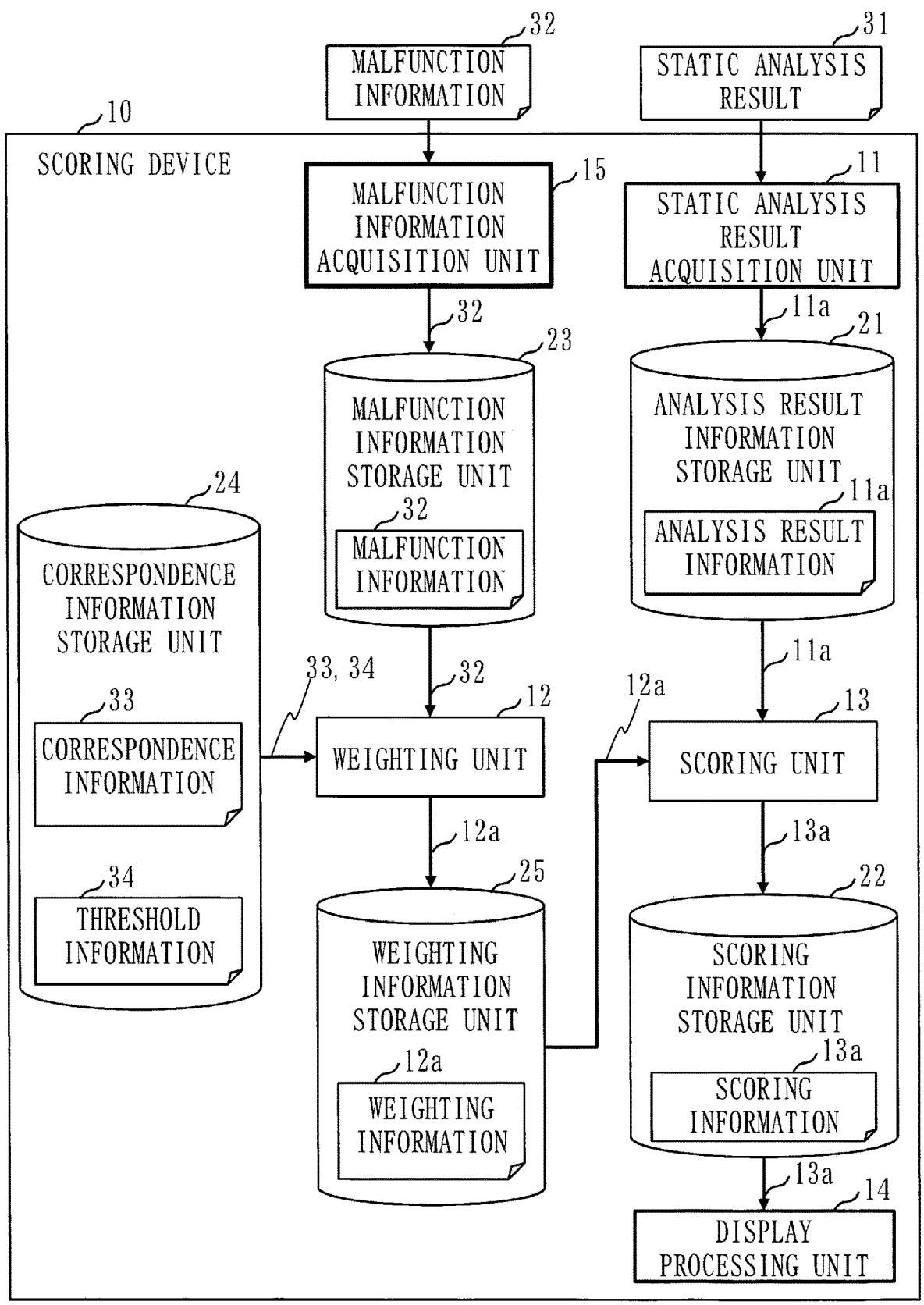
FIG. 13 is a diagram of Embodiment 1, which is a function block diagram of a scoring device of Modification 1.

FIG. 13 is a function block diagram of a modification of the scoring device 10. The scoring device 10 of FIG. 13 further has a malfunction information acquisition unit 15, when compared with FIG. 1. The malfunction information acquisition unit 15 can acquire malfunction information 32.

Figure 14:
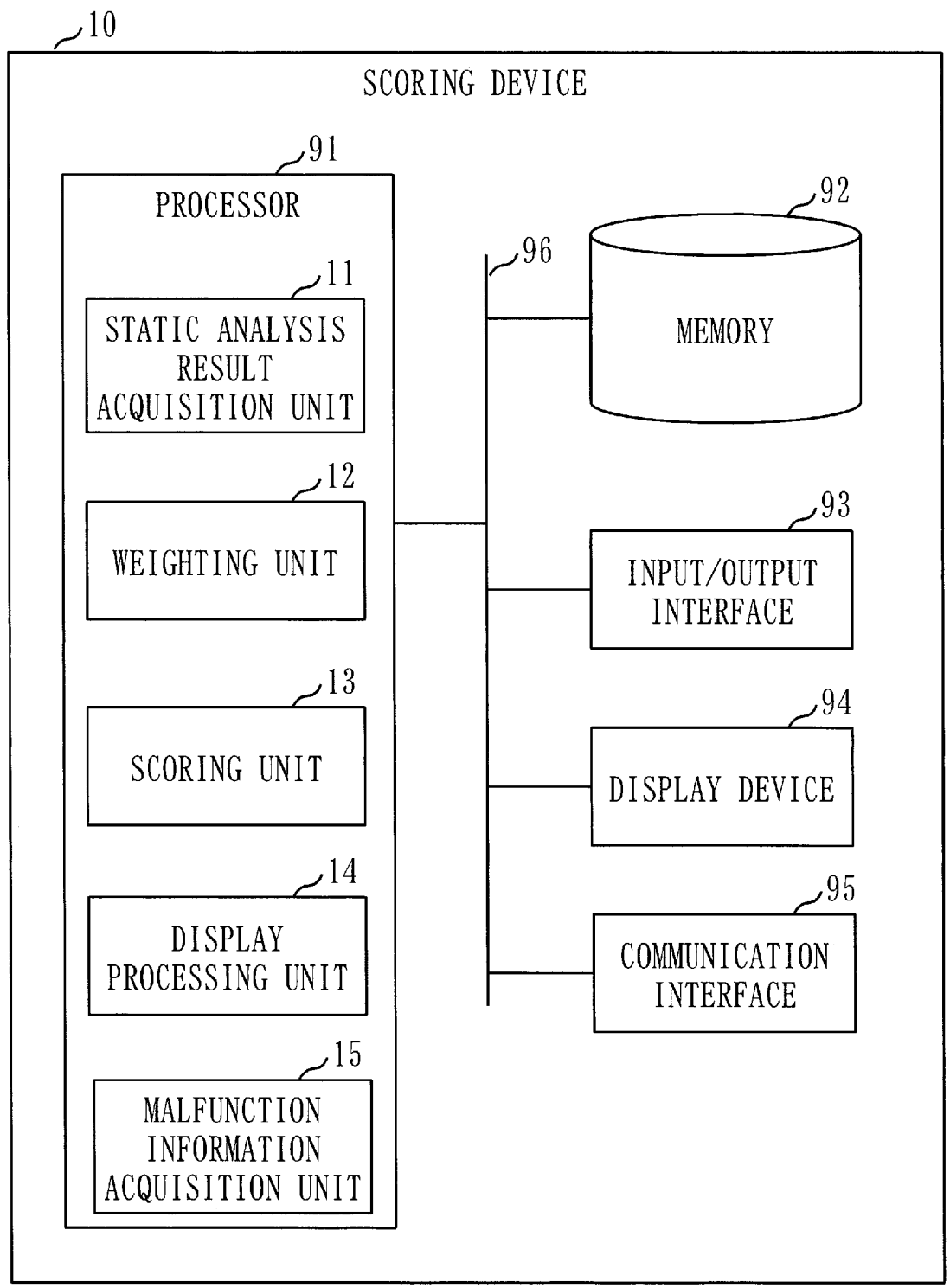
FIG. 14 is a diagram of Embodiment 1, which is a hardware configuration diagram of the scoring device of Modification 1.

FIG. 14 illustrates a hardware configuration of the scoring device 10 of FIG. 13. The hardware configuration of FIG. 13 additionally includes the malfunction information acquisition unit 15, when compared with FIG. 2. Functions of a static analysis result acquisition unit 11, weighting unit 12, scoring unit 13, display processing unit 14, and malfunction information acquisition unit 15 are implemented by a scoring program, as in the case of FIG. 2. The malfunction information acquisition unit 15 acquires the malfunction information 32 via an input/output interface 93 or a communication interface 95.

In both of FIGS. 1 and 13, the correspondence information 33 and the threshold information 34 can be set and changed by an input/output interface 93 such as a mouse and a keyboard.

As has been described above, the malfunction information acquisition unit 15 acquires the malfunction information 32 and stores the acquired malfunction information 32 into a malfunction information storage unit 23 which is a memory. A weighting unit 12 generates weighting information 12a using the malfunction information 32 acquired by the malfunction information acquisition unit 15.

According to Modification 1, the malfunction information 32 can be changed flexibly.

Modification 2

Figure 15:
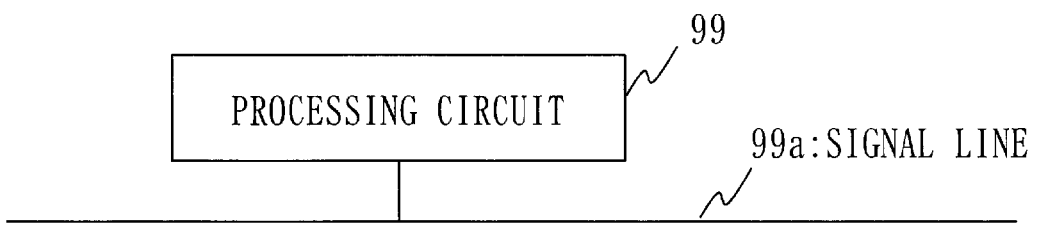
FIG. 15 is a diagram of Embodiment 1, which is a diagram illustrating a circuit configuration of Modification 2.

FIG. 15 illustrates Modification 2. In the hardware configurations illustrated in FIGS. 2 and 14, the function of the "unit" presented as the processor 91 is implemented by software. However, in Modification 2, the function of the "unit" presented as the processor 91 may be implemented by hardware. Specifically, the function of the "unit" presented as the processor 91 and the function of the "storage unit" are implemented by a processing circuit 99, as illustrated in FIG. 15. The processing circuit 99 is connected to a signal line 99a. The processing circuit 99 is a dedicated electronic circuit that implements the function of the "unit" presented as the processor 91 and the function of the "storage unit". The processing circuit 99 is specifically a single circuit, a composite circuit, a programmed processor, a parallel-programmed processor, a logic IC, a Gate Array (GA), an Application Specific Integrated Circuit (ASIC), or a Field-Programmable Gate Array (FPGA).

Both the processor 91 and the processing circuit 99 are called processing circuitry as well. That is, in the scoring device 10, the functions of the static analysis result acquisition unit 11, weighting unit 12, scoring unit 13, display processing unit 14, and malfunction information acquisition unit 15 are implemented by processing circuitry.

Effect of Embodiment 1

As the storing device described above generates the analysis result information 11a, a warning of a static analysis that may be directly connected to a malfunction with a high probability, a file name of a file for which warning has been received, and a row number that indicates a portion of a possible malfunction can be identified.

Embodiment 1 has been described above. Of Embodiment 1, one portion may be partly practiced. Alternatively, of Embodiment 1, two portions or more may be partly combined and practiced. The present invention is not limited to Embodiment 1, and various changes can be made where necessary.

REFERENCE SIGNS LIST

10: scoring device; 11: static analysis result acquisition unit; 11a: analysis result information; 12: weighting unit; 12a: weighting information; 13: scoring unit; 13a: scoring information; 14: display processing unit; 15: malfunction information acquisition unit; 21: analysis result information storage unit; 22: scoring information storage unit; 23: malfunction information storage unit; 24: correspondence information storage unit; 25: weighting information storage unit; 31: static analysis result; 32: malfunction information; 33: correspondence information; 34: threshold information; 91: processor; 92: memory; 93: input/output interface; 94: display device; 95: communication interface; 99: processing circuit; 99a: signal line.

The invention claimed is:

1. A scoring device comprising:
processing circuitry
to calculate, by using correspondence information having a plurality of records in each of which a first warning type that indicates a type of warning being made based on static analysis of a source code and a first malfunction cause type that indicates information indicating a classification of a cause of a past malfunction are associated with each other, and by using malfunction information having a plurality of second malfunction cause types each of which indicates information indicating a classification of a cause of a past malfunction, a count of second malfunction cause types each corresponding to the first malfunction cause type of the record, and to generate weighting information by weighting the first warning type corresponding to the first malfunction cause type according to the calculated count, and
to score, among a plurality of second warning types included in analysis result information being a result of static analysis of the source code, a second warning type corresponding to the first warning type of the weighting information, based on the generated weighting information.

2. A scoring device comprising:
processing circuitry
to determine, by using correspondence information having a plurality of records in each of which a first warning type that indicates a type of warning being made based on static analysis of a source code and a first malfunction cause type that indicates a type of a cause of a past malfunction are associated with each other, and by using malfunction information having a plurality of second malfunction cause types each of which indicates a type of a cause of a past malfunction, a count of second malfunction cause types each corresponding to the first malfunction cause type of the record, to give a score to the first warning type corresponding to the first malfunction cause type, according to the determined count, and to generate weighting information in which the first warning type and the score are associated with each other, and
to give the score having been given to the first warning type to, among the plurality of second warning types of analysis result information, a second warning type corresponding to the first warning type of the weighting information, the analysis result information including the plurality of second warning types which are a result of static analysis of the source code.

3. The scoring device according to claim 1,
wherein in the analysis result information, individual ones of the plurality of second warning types and file names expressing the source code are associated with each other, and
wherein the processing circuitry calculates a total of scores of second warning types whose file names are the same.

4. The scoring device according to claim 2,
wherein in the analysis result information, individual ones of the plurality of second warning types and file names expressing the source code are associated with each other, and
wherein the processing circuitry calculates a total of scores of second warning types whose file names are the same.

5. The scoring device according to claim 1,
wherein the processing circuitry generates the weighting information using threshold information in which a count of malfunctions and a score are associated with each other.

6. The scoring device according to claim 2,
wherein the processing circuitry generates the weighting information using threshold information in which a count of malfunctions and a score are associated with each other.

7. The scoring device according to claim 3,
wherein the processing circuitry generates the weighting information using threshold information in which a count of malfunctions and a score are associated with each other.

8. The scoring device according to claim 4,
wherein the processing circuitry generates the weighting information using threshold information in which a count of malfunctions and a score are associated with each other.

9. The scoring device according to claim 1,
wherein the processing circuitry
acquires the malfunction information and stores the acquired malfunction information, and
generates the weighting information using the acquired malfunction information.

10. The scoring device according to claim 2,
wherein the processing circuitry
acquires the malfunction information and stores the acquired malfunction information, and
generates the weighting information using the acquired malfunction information.

11. The scoring device according to claim 3,
wherein the processing circuitry
acquires the malfunction information and stores the acquired malfunction information, and
generates the weighting information using the acquired malfunction information.

12. The scoring device according to claim 4,
wherein the processing circuitry
acquires the malfunction information and stores the acquired malfunction information, and generates the weighting information using the acquired malfunction information.

13. The scoring device according to claim 5,
wherein the processing circuitry
acquires the malfunction information and stores the acquired malfunction information, and
generates the weighting information using the acquired malfunction information.

14. The scoring device according to claim 6,
wherein the processing circuitry
acquires the malfunction information and stores the acquired malfunction information, and
generates the weighting information using the acquired malfunction information.

15. The scoring device according to claim 7,
wherein the processing circuitry
acquires the malfunction information and stores the acquired malfunction information, and
generates the weighting information using the acquired malfunction information.

16. The scoring device according to claim 8,
wherein the processing circuitry
acquires the malfunction information and stores the acquired malfunction information, and
generates the weighting information using the acquired malfunction information.

17. A non-transitory computer readable medium recorded with a scoring program which causes a computer to execute:
a process of calculating, by using correspondence information having a plurality of records in each of which a first warning type that indicates a type of warning being made based on static analysis of a source code and a first malfunction cause type that indicates information indicating a classification of a cause of a past malfunction are associated with each other, and by using malfunction information having a plurality of second malfunction cause types each of which indicates information indicating a classification of a cause of a past malfunction, a count of second malfunction cause types each corresponding to the first malfunction cause type of the record, and generating weighting information by weighting the first warning type corresponding to the first malfunction cause type according to the calculated count; and
a process of scoring, among a plurality of second warning types included in analysis result information being a result of static analysis of the source code, a second warning type corresponding to the first warning type of the weighting information, based on the generated weighting information.

18. A non-transitory computer readable medium recorded with a scoring program which causes a computer to execute:
a process of determining, by using correspondence information having a plurality of records in each of which a first warning type that indicates a type of warning being made based on static analysis of a source code and a first malfunction cause type that indicates a type of a cause of a past malfunction are associated with each other, and by using malfunction information having a plurality of second malfunction cause types each of which indicates a type of a cause of a past malfunction, a count of second malfunction cause types each corresponding to the first malfunction cause type of the record, giving a score to the first warning type corresponding to the first malfunction cause type according to the determined count, and generating weighting information in which the first warning type and the score are associated with each other; and
a process of giving the score having been given to the first warning type to, among the plurality of second warning types of analysis result information, a second warning type corresponding to the first warning type of the weighting information, the analysis result information including the plurality of second warning types which are a result of static analysis of the source code.

19. A scoring method comprising:
calculating, by using correspondence information having a plurality of records in each of which a first warning type that indicates a type of warning being made based on static analysis of a source code and a first malfunction cause type that indicates information indicating a classification of a cause of a past malfunction are associated with each other, and by using malfunction information having a plurality of second malfunction cause types each of which indicates information indicating a classification of a cause of a past malfunction, a count of second malfunction cause types each corresponding to the first malfunction cause type of the record, and generating weighting information by weighting the first warning type corresponding to the first malfunction cause type according to the calculated count; and
scoring, among a plurality of second warning types included in analysis result information being a result of static analysis of the source code, a second warning type corresponding to the first warning type of the weighting information, based on the generated weighting information.

20. A scoring method comprising:
determining, by using correspondence information having a plurality of records in each of which a first warning type that indicates a type of warning being made based on static analysis of a source code and a first malfunction cause type that indicates a type of a cause of a past malfunction are associated with each other, and by using malfunction information having a plurality of second malfunction cause types each of which indicates a type of a cause of a past malfunction, a count of second malfunction cause types each corresponding to the first malfunction cause type of the record, giving a score to the first warning type corresponding to the first malfunction cause type according to the determined count, and generating weighting information in which the first warning type and the score are associated with each other; and
giving the score having been given to the first warning type to, among the plurality of second warning types of analysis result information, a second warning type corresponding to the first warning type of the weighting information, the analysis result information including the plurality of second warning types which are a result of static analysis of the source code.

* * * * *